(12) United States Patent
Tokumoto

(10) Patent No.: US 11,481,171 B2
(45) Date of Patent: Oct. 25, 2022

(54) IMAGE FORMING SYSTEM, SERVER, CONTROL METHOD FOR IMAGE FORMING SYSTEM, CONTROL METHOD FOR SERVER, AND STORAGE MEDIUM

(71) Applicant: CANON KABUSHIKI KAISHA, Tokyo (JP)

(72) Inventor: Hirokazu Tokumoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/541,084

(22) Filed: Dec. 2, 2021

(65) Prior Publication Data
US 2022/0188051 A1 Jun. 16, 2022

(30) Foreign Application Priority Data
Dec. 11, 2020 (JP) .............................. JP2020-205901

(51) Int. Cl.
*G06F 3/12* (2006.01)
*H04N 1/00* (2006.01)

(52) U.S. Cl.
CPC .......... *G06F 3/1258* (2013.01); *G06F 3/1204* (2013.01); *G06F 3/1288* (2013.01); *H04N 1/00474* (2013.01); *H04N 1/00514* (2013.01)

(58) Field of Classification Search
None
See application file for complete search history.

(56) References Cited

U.S. PATENT DOCUMENTS

| 9,165,228 | B2 * | 10/2015 | Koike | ............... | G06K 15/1809 |
| 2016/0165077 | A1 * | 6/2016 | Shibata | ................. | G06F 3/1257 |
| | | | | | 358/1.15 |
| 2020/0278817 | A1 * | 9/2020 | Tokumoto | ............. | G06F 3/1207 |

FOREIGN PATENT DOCUMENTS

| JP | 2007251279 A | 9/2007 |
| JP | 2010211627 A | 9/2010 |

* cited by examiner

*Primary Examiner* — Paul F Payer
(74) *Attorney, Agent, or Firm* — Canon U.S.A., Inc. IP Division

(57) ABSTRACT

An image forming system includes a server and a plurality of image forming apparatuses having a print function and connected to the server via a network. The server includes one or more first processors that execute first instructions to provide an administrator screen configured to make a first setting related to the print function and make a second setting for defining an application target of the first setting from among the image forming apparatuses, and manage setting information about the print function of each of the image forming apparatuses based on the first and second settings made on the administrator screen. An image forming apparatus included in the image forming apparatuses includes one or more second processors that execute second instructions to obtain the setting information about the print function of the image forming apparatus via the network, and apply the obtained setting information to the image forming apparatus.

11 Claims, 13 Drawing Sheets

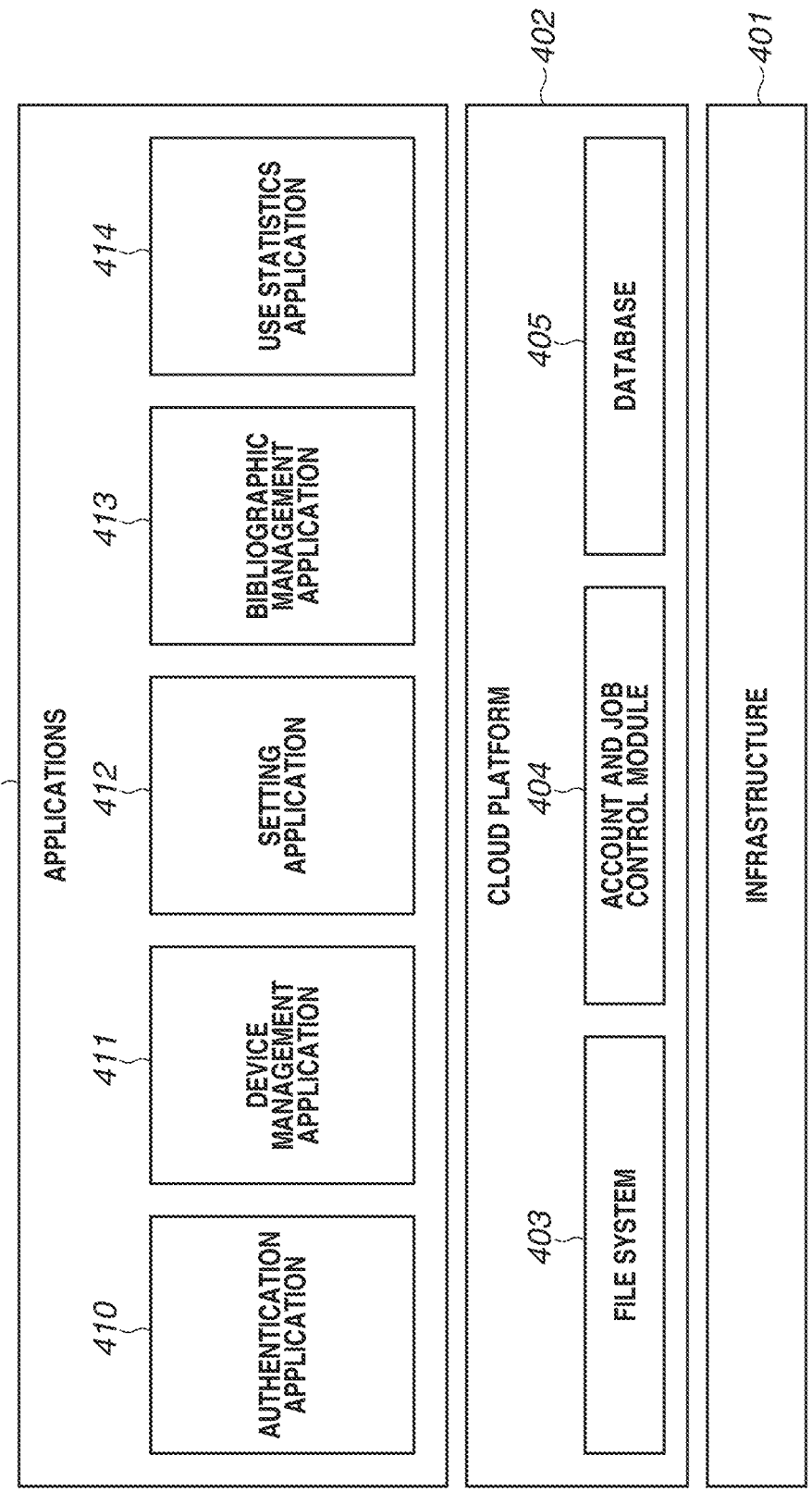

| | |
|---|---|
| HOLD EXCEPTION CONDITION EDIT | 601 SATO IS LOGGED IN |

- CONDITION NAME: LPR PROHIBITED — 602
- TYPE: PORT — 603
- PORT: LPR — 604
- OPERATION: CANCEL — 605

606 CANCEL   607 OK

| | |
|---|---|
| HOLD EXCEPTION CONDITION EDIT | 611 SATO IS LOGGED IN |

- CONDITION NAME: STORE SHARED JOB — 612
- TYPE: USERNAME — 613
- USERNAME: — 614
- OPERATION: HOLD AS SHARED JOB — 615

616 CANCEL   617 OK

<TENANT> — 801
A

<LOCATION> — 802
WEST
EAST

<GROUP> — 803
1
2

EXTENDED FUNCTIONS > REMOTE PRINTING > EXCEPTION CONDITION SETTINGS

☐ APPLY SAME SETTINGS AS AT ONE HIERARCHICAL LEVEL ABOVE — 804

| PRIORITY | CONDITION NAME |
|---|---|
| 1 | GUEST USER PRINTING |

— 805
807 ▲▼
901

[REGISTER] — 808   [EDIT] — 810   [DELETE] — 809

[SAVE] — 811

<TENANT> — 801
A

<LOCATION> — 802
WEST
EAST

<GROUP> — 803
1
2

EXTENDED FUNCTIONS > REMOTE PRINTING > EXCEPTION CONDITION SETTINGS

CONDITION NAME   [GUEST USER PRINTING] — 910

TYPE   [USERNAME ▼] — 911

USERNAME   [                    ] — 912

OPERATION   [PRINT ▼] — 913

[CANCEL] — 915   [OK] — 914

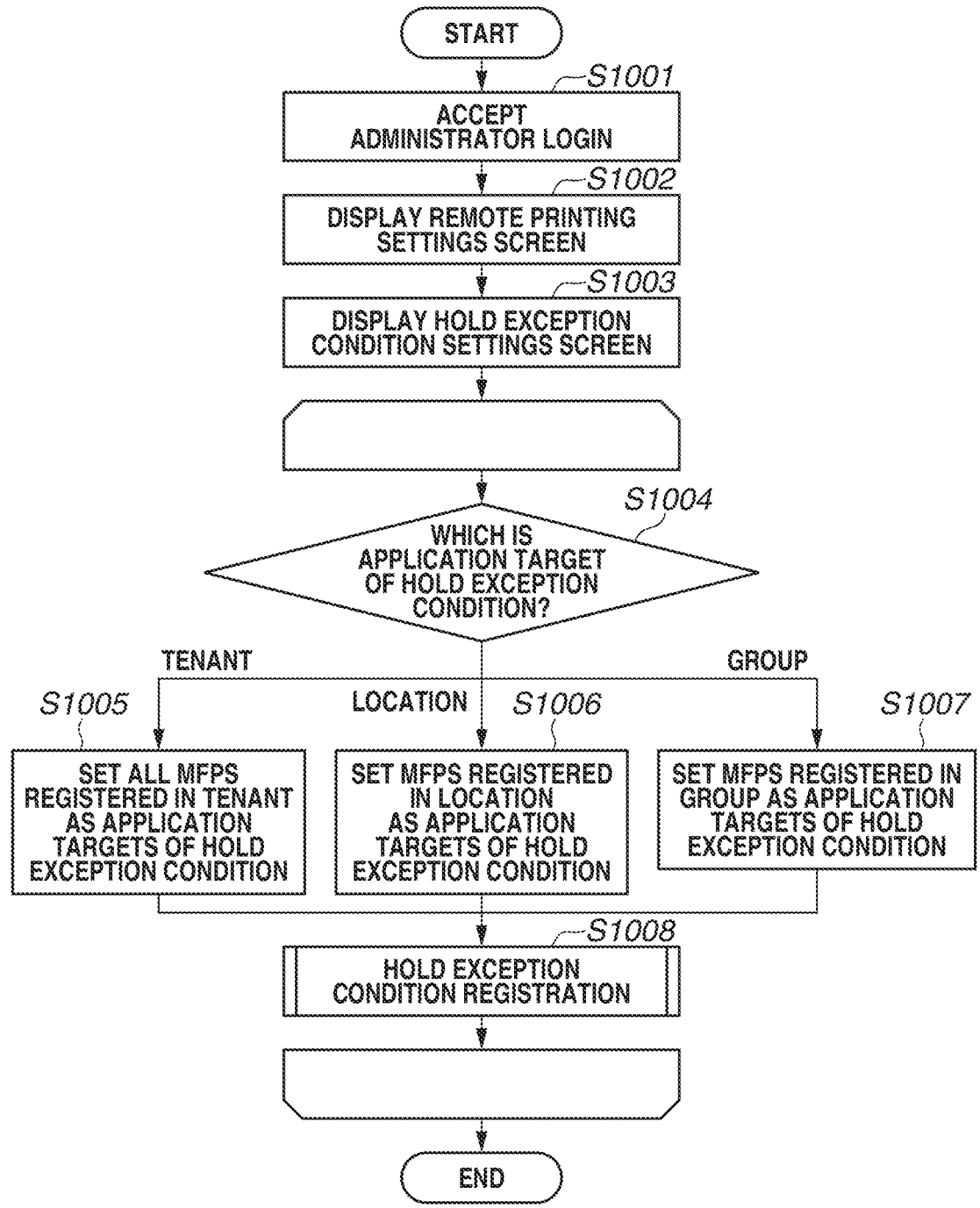

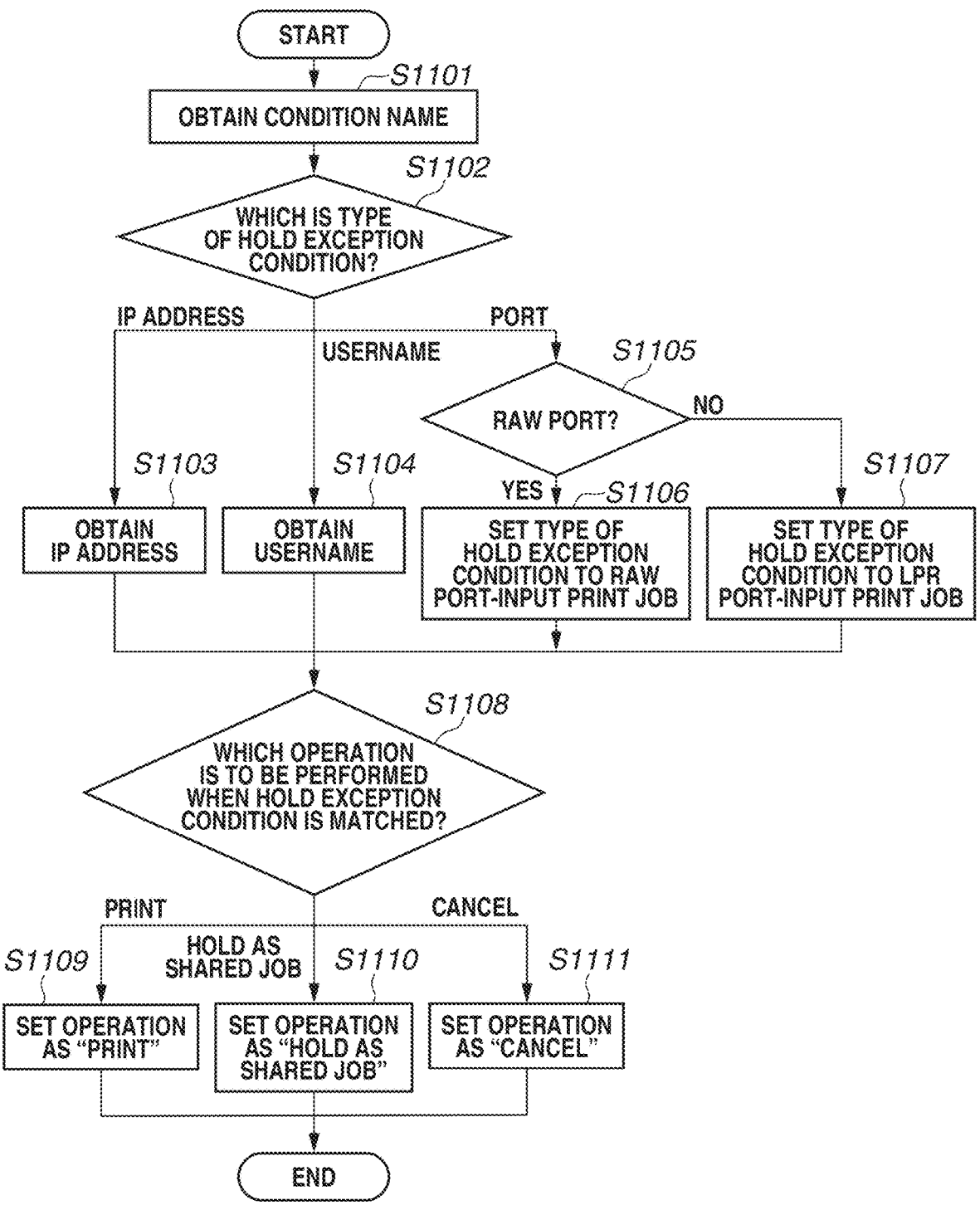

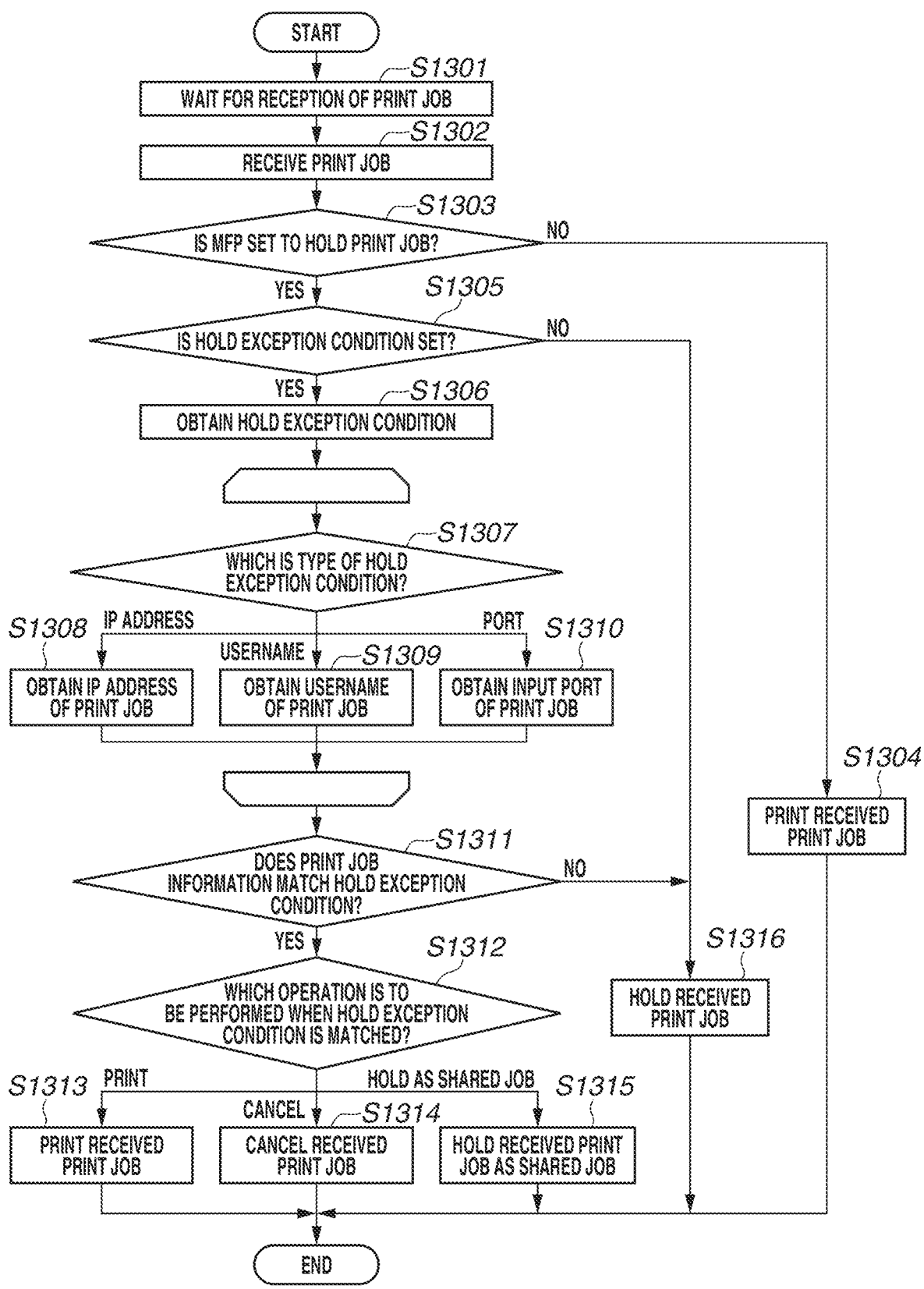

IMAGE FORMING SYSTEM, SERVER, CONTROL METHOD FOR IMAGE FORMING SYSTEM, CONTROL METHOD FOR SERVER, AND STORAGE MEDIUM

BACKGROUND

Field of the Disclosure

The present disclosure relates to an image forming system, a server, a control method for the image forming system, a control method for the server, and a storage medium.

Description of the Related Art

Conventional multifunction peripherals (MFPs) print a print job immediately after receiving the print job from a terminal apparatus such as a personal computer (PC). This may cause print products to be forgotten to be taken out or cause information leakage due to the print products being left and seen by a third party. To address this issue, hold printing in which an MFP holds a received print job in a nonvolatile storage area of the MFP without printing the print job and then the user gives a print instruction on an operation unit of the MFP to print the print job has been discussed in recent years for confidentiality purposes (refer to Japanese Patent Application Laid-Open No. 2007-251279). Remote printing has also been recently discussed in which a print job received and held by an MFP can be printed not only by the MFP holding the print job but also by another MFP obtaining the held print job (refer to Japanese Patent Application Laid-Open No. 2010-211627).

In the hold printing, hold exception condition settings have also been implemented. The hold exception condition settings enable switching the operation of uniformly holding all print jobs in the MFP to the operation of printing a print job without holding the print job depending on the condition of the print job.

However, the hold exception condition settings include a lot of setting items and are complicated. Moreover, according to the conventional techniques, the hold exception condition settings are made for all MFPs, which are the targets of the remote printing, one by one on the operation units of the MFPs. It is troublesome to make such complicated settings with a lot of setting items for all the MFPs one by one by using the operation units of the respective MFPs, and there is an issue of taking long for the administrator to make the settings.

SUMMARY

According to embodiments of the present disclosure, an image forming system includes a server, and a plurality of image forming apparatuses having a print function and connected to the server via a network. The server includes one or more first memories, and one or more first processors that execute a set of first instructions to provide an administrator screen configured to make a first setting related to the print function and make a second setting for defining an application target of the first setting from among the plurality of image forming apparatuses, and manage setting information about the print function of each of the plurality of image forming apparatuses based on the first setting and the second setting that are made on the administrator screen. An image forming apparatus included in the plurality of image forming apparatuses includes one or more second memories, and one or more second processors that execute a set of second instructions to obtain the setting information about the print function of the image forming apparatus via the network, and apply the obtained setting information to the image forming apparatus.

Further features of the present disclosure will become apparent from the following description of exemplary embodiments with reference to the attached drawings.

BRIEF DESCRIPTION OF THE DRAWINGS

FIG. 4 is a diagram illustrating a software configuration example of a cloud server.

FIGS. 6A and 6B are diagrams illustrating examples of a hold exception condition edit screen.

FIG. 7A is a diagram illustrating an example of a device management display screen. FIG. 7B is an example of an extended function settings screen.

FIG. 9A is a diagram illustrating another example of the hold exception condition settings screen. FIG. 9B is a diagram illustrating another example of the hold exception condition edit screen.

FIG. 10 is a flowchart illustrating an example of a hold exception condition setting procedure.

FIG. 11 is a flowchart illustrating an example of hold exception condition registration processing.

FIG. 13 is a flowchart illustrating an example of an exception condition determination processing procedure for a print job.

DESCRIPTION OF THE EMBODIMENTS

Exemplary embodiments of the present disclosure will be described below with reference to the drawings.

<Network Configuration of Remote Printing System (Image Forming System)>

Figure 1:
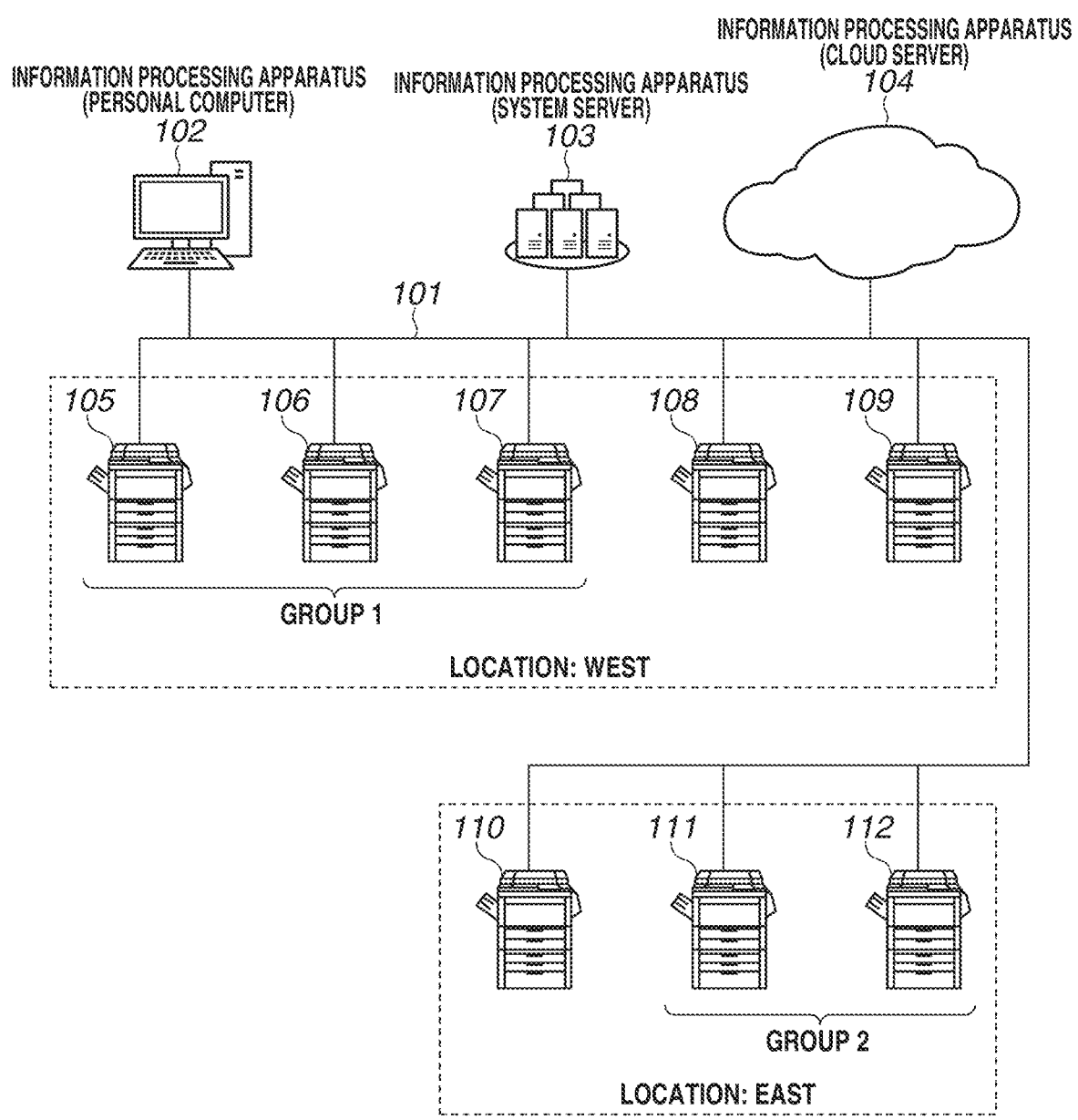
FIG. 1 is a diagram illustrating an example of a network configuration of a remote printing system.

FIG. 1 illustrates an example of a network configuration to which multifunction peripherals (MFPs), which are image forming apparatuses according to an exemplary embodiment of the present disclosure, and a cloud server and a system server, which are information processing apparatuses, can be applied. In FIG. 1, a network 101 supports the Transmission Control Protocol/Internet Protocol (TCP/IP), for example. A personal computer (PC) 102, a system server 103, and a cloud server 104, which are information processing apparatuses, and MFPs 105 to 112 are connected to the network 101, whereby a remote printing system (an image forming system) is formed.

Each of the MFPs 105 to 112 can receive a print job generated by the PC 102 or the system server 103 via the network 101. In using a remote printing function, each of the MFPs 105 to 112 stores the received print job, generates bibliographic information from the print job, and transmits the bibliographic information to the cloud server 104.

Each of the MFPs 105 to 112 also receives authentication information from a user logging in via an operation unit 206 (see FIG. 2) and performs authentication. After the user authentication, each of the MFPs 105 to 112 can obtain bibliographic information from the cloud server 104 based on the authentication information, receive a print job from an MFP storing the print job based on the obtained bibliographic information, and print the print job.

In the present exemplary embodiment, the MFPs 105 to 109 and the MFPs 110 to 112 are disposed in different locations. The MFPs 105 to 109 are disposed in a location identified as "west" by location information ("location"). The MFPs 110 to 112 are disposed in a location identified as "east" by location information ("location"). Among the MFPs 105 to 109 disposed in the location identified as "west" by the location information ("location"), the MFPs 105, 106, and 107 are included in a device group called group "1". Similarly, among the MFPs 110 to 112 disposed in the location identified as "east" by the location information ("location"), the MFPs 111 and 112 are included in a device group called group "2".

The cloud server 104 collectively manages the bibliographic information about the print jobs stored in all the MFPs 105 to 112 registered on the same network 101. The information processing apparatus that manages the bibliographic information is not limited to the cloud server 104. Any of the MFPs 105 to 112 on the network 101 may be configured to manage the bibliographic information.

However, the management of the bibliographic information by the cloud server 104 can provide the following advantages. Suppose, for example, that any of the MFPs 105 to 112 manages the bibliographic information. In this case, since the MFPs 105 to 112 have a copy function and a scan function, the responsiveness of the bibliographic information management can deteriorate if the operation of these functions conflicts with that of the bibliographic information management function or if requests for the bibliographic information management function concentrate. The management of the bibliographic information by the cloud server 104 can maintain the responsiveness of the bibliographic information management even if processing loads concentrate. If any of the MFPs 105 to 112 is used as a bibliographic management server, the bibliographic management server is not much scalable in terms of the upper limit of manageable bibliographic information due to limited storage capacity resources. By contrast, the management of the bibliographic information by the cloud server 104 makes it easy to expand the upper limit of manageable bibliographic information. Moreover, if any of the MFPs 105 to 112 is used as the bibliographic management server, since the MFPs 105 to 112 can be in a power off state, this may cause downtime of the bibliographic management server. On the other hand, the management of the bibliographic information by the cloud server 104 can reduce downtime.

While a typical configuration has been described above for ease of description, the remote printing system may include a plurality of the PCs 102 and a plurality of the system servers 103. In addition, the MFPs 105 to 112 may be printers having only a print function without having multiple functions such as the scan function and the copy function. Furthermore, the configuration of the MFPs 105 to 112 connected to the network 101 is not limited to that illustrated in FIG. 1, and may be any other configuration. For example, the MFPs 105 to 112 connected to the network 101 may be disposed in three or more different locations. Alternatively, a plurality of device groups may be included in one location.

<Schematic Configuration of MFP>

Figure 2:
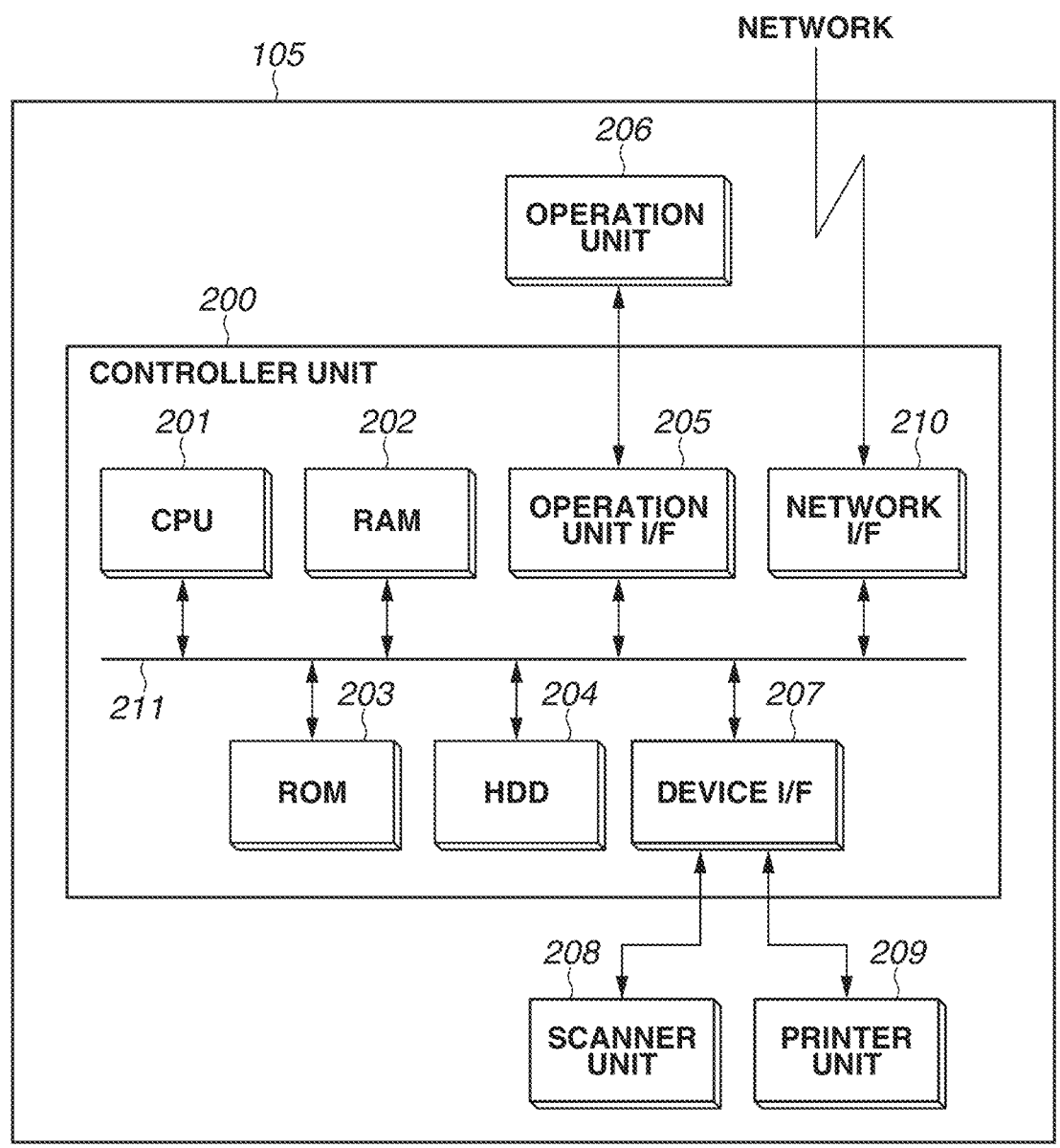
FIG. 2 is a diagram illustrating a schematic configuration example of a multifunction peripheral (MFP).

FIG. 2 is a block diagram illustrating a schematic configuration example of each of the MFPs 105 to 112 according to the present exemplary embodiment. For simplification of description, the MFP 105 is illustrated as an example in FIG. 2. In FIG. 2, the MFP 105 includes a controller unit 200, the operation unit 206, a scanner unit 208, and a printer unit 209.

The controller unit 200 controls the MFP (or the printer) 105. The controller unit 200 includes a central processing unit (CPU) 201, a random access memory (RAM) 202, a read-only memory (ROM) 203, a hard disk drive (HDD) 204, an operation unit interface (I/F) 205, a device I/F 207, and a network I/F 210, which are connected via a system bus 211.

The CPU 201 controls the components connected to the system bus 211 in a centralized manner and controls the entire MFP 105. The RAM 202 stores programs such as an operating system, system software, and application software, and data. The ROM 203 stores a system boot program, system programs, and application programs. Fonts and other information used by the image forming apparatus (the MFP 105) may also be stored in the ROM 203. The HDD 204 stores an operating system, system software, application software, image data, setting data, and print jobs. The programs stored in the RAM 202 are executed by the CPU 201 to process the image data and non-image data stored in the RAM 202, the ROM 203, and the HDD 204. If the MFP 105 is compact in size, the MFP 105 can be configured to not include the HDD 204 and store the system software and the application software in the ROM 203. Alternatively, storage devices other than a hard disk, such as a solid-state drive (SSD) and other flash memories, may be used instead of the HDD 204.

The operation unit I/F 205 is an I/F unit with the operation unit 206 including a touch panel. The operation unit I/F 205 outputs, to the operation unit 206, image data to be displayed on the operation unit 206. The operation unit I/F 205 also transmits, to the CPU 201, information input by a user via the operation unit 206.

The device I/F 207 connects the scanner unit 208 and the printer unit 209, which are image input/output devices, to the controller unit 200, and inputs and outputs image data. Image data input from the scanner unit 208 via the device I/F 207 is stored in the RAM 202 or the HDD 204. The application programs stored in the ROM 203 perform image processing on the stored image data as appropriate. Moreover, image data is output to the printer unit 209 via the device I/F 207. The network I/F 210 connects to the network 101, and inputs and outputs image data or information for controlling the MFP 105 from and to an external apparatus on the network 101.

The configuration of the MFP 105 is not limited to that illustrated in FIG. 2 and may be any other configuration as long as the effects of the present exemplary embodiment are obtained. For example, if the MFP 105 has a facsimile (FAX) function, the controller unit 200 may include an I/F for a modem device not illustrated in FIG. 2 so that the MFP 105 can connect to a public telephone line and perform FAX transmission via the modem device. As another example, the controller unit 200 may include an unillustrated Universal Serial Bus (USB) I/F to enable reading and printing of data stored in a flash memory card.

<Software Configuration of MFP>

Figure 3:
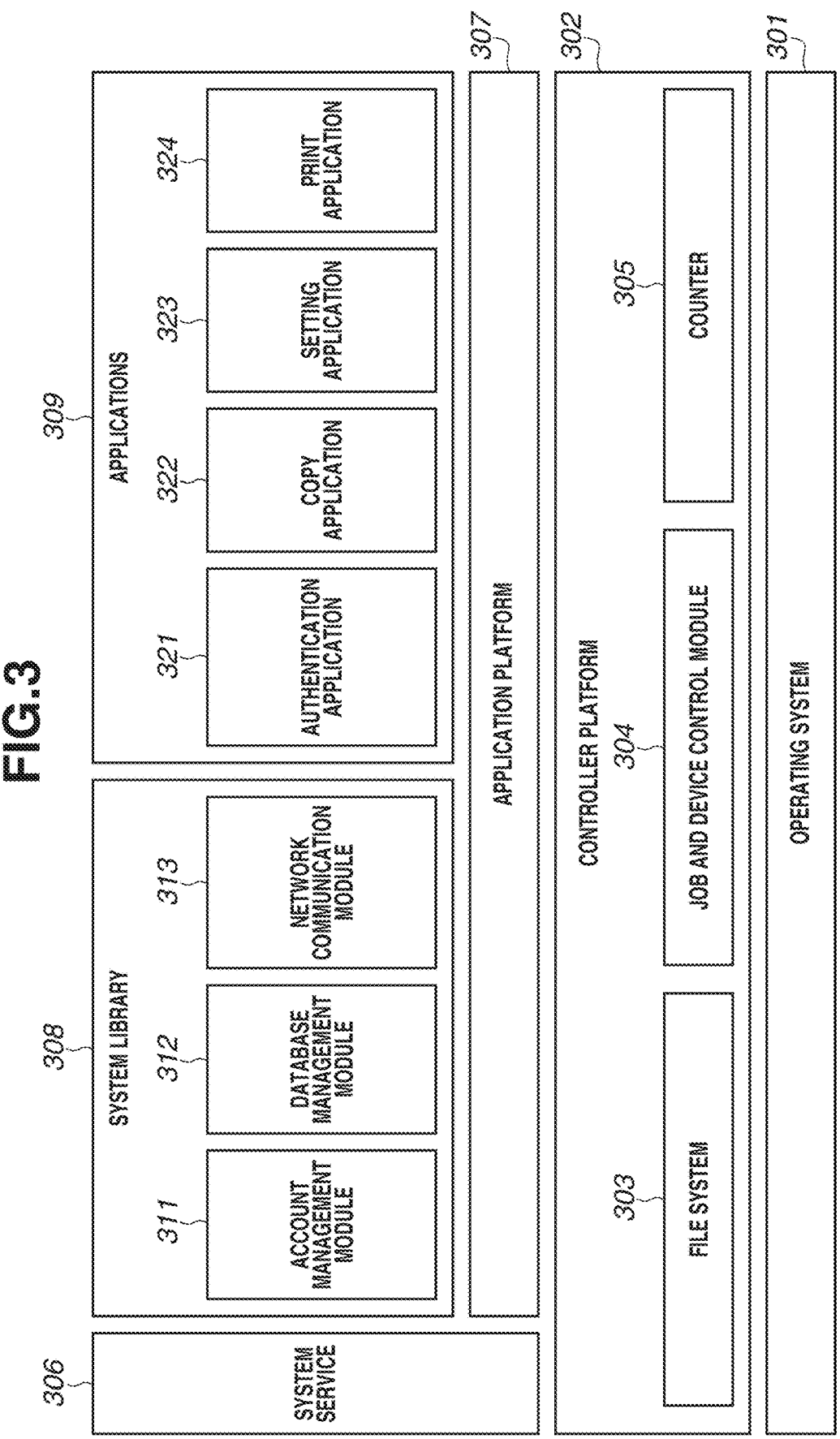
FIG. 3 is a diagram illustrating a software configuration example of the MFP.

FIG. 3 is a block diagram illustrating a software configuration example of each of the MFPs 105 to 112 according to the present exemplary embodiment. The software configuration is implemented in the controller unit 200. The software built in each of the MFPs (or the printers) 105 to 112 and processed by the controller unit 200 is implemented as firmware, and executed by the CPU 201. For simplification of description, the following description will be given using the MFP 105 as an example.

An operating system 301 provides, to the software running thereon, various resource management services and frameworks optimized for controlling the built-in system. The various resource management services and frameworks provided by the operating system 301 include multitask management in which a plurality of processing execution contents for the CPU 201 is managed to run a plurality of processes substantially in parallel, and intertask communication for implementing task-to-task synchronization and data exchange. The operating system 301 further provides memory management services, interrupt management services, various device drivers, and protocol stacks implementing various protocol processes for local I/Fs, networks, and communications.

A controller platform 302 includes a file system 303, a job and device control module 304, and a counter 305. The file system 303 is a mechanism for storing data constructed on a storage device such as the HDD 204 or the RAM 202. The file system 303 is used to spool jobs to be handled by the controller unit 200 and store various types of data. The job and device control module 304 controls the hardware of the MFP (or the printer) 105, and controls jobs that use basic functions (e.g., print, scan, communication, image conversion) mainly provided by the hardware. The counter 305 manages counter values based on the expiration date of each application and the use records of the print and scan functions.

A system service 306 is a module for monitoring the operation status of the MFP (or the printer) 105, and for downloading software and licenses from a software distribution server via the network 101. An application platform 307 is a middleware for making the mechanisms of the operating system 301 and the controller platform 302 usable by a system library 308 and applications 309 to be described below.

The system library 308 is software modules for providing the functions of services usable by the applications 309. The system library 308 includes an account management module 311, a database management module 312, and a network communication module 313. The applications 309 are software modules for providing various functions implemented by the MFP (or the printer) 105 to the user. The applications 309 can display a menu on the operation unit 206 and receive a user's input via the operation unit 206.

An authentication application 321 is one of the applications 309. The authentication application 321 uses the account management module 311 included in the system library 308 to manage users who can use the MFP 105. The account management module 311 communicates with an authentication application 410 (described below) on the cloud server 104 by using the network communication module 313, and performs user authentication. The authentication application 321 communicates with the authentication application 410 to collate a username and a password input via the operation unit 206, and performs user authentication.

A copy application 322 is one of the applications 309. The copy application 322 accesses the job and device control module 304 via the application platform 307, and provides a paper document copy function. A setting application 323 is one of the applications 309. The setting application 323 accesses the job and device control module 304 via the application platform 307, and provides a function of controlling setting values related to operation settings of the MFP 105.

A print application 324 is one of the applications 309. If the remote printing function is enabled, the print application 324 holds a received print job, generates bibliographic information from the print job, and transmits a registration request to the cloud server 104. The print application 324 communicates with the cloud server 104 by using the network communication module 313, and displays a print queue and changes and deletes settings based on obtained bibliographic information. The print application 324 also connects to the other MFPs 106 to 112 by using the network communication module 313, and provides the remote printing function of holding an obtained print job in the HDD 204 and printing the print job. The print application 324 accesses the job and device control module 304 via the application platform 307, and provides a function of outputting the print job held in the HDD 204.

<Software Configuration of Cloud Server>

FIG. 4 is a block diagram illustrating a software configuration example of the cloud server 104 according to the present exemplary embodiment. The software configuration is implemented on the cloud server 104.

Infrastructure 401 is the foundations for the cloud server 104 to provide services, and includes a server, a virtual machine, a storage, a network, and an operating system. A cloud platform 402 is a framework that provides common basic functions to applications 407 by using the infrastructure 401. The cloud platform 402 includes a file system 403, an account and job control module 404, and a database 405.

The applications 407 can communicate with a web browser running on an information processing apparatus (e.g., the PC 102) on the network 101, and display a menu on the web browser screen of the information processing apparatus and receive an input from the user. The applications 407 are software modules for managing user accounts with which the MFPs (or the printers) 105 to 112 can be used, visualizing use statistics of the MFPs (or the printers) 105 to 112, and providing the users with various functions using the MFPs (or the printers) 105 to 112.

The authentication application 410 is one of the applications 407. The authentication application 410 uses the account and job control module 404 of the cloud platform 402 to manage the users who can use the MFPs 105 to 112. The authentication application 410 receives information about a user requesting authentication from the authentication application 321 on each of the MFPs 105 to 112 via the network 101, and collates the username and password. The user authentication may use an external authentication server, such as an Active Directory server or a Lightweight Directory Access Protocol (LDAP) server, instead of using the account and job control module 404 of the cloud platform 402.

A device management application 411 is one of the applications 407. The device management application 411 performs device management including registration, editing, and deletion of the MFPs 105 to 112 to be connected. A setting application 412 is one of the applications 407. The setting application 412 sets functions to be provided to the users through cloud services using the cloud server 104.

A bibliographic management application 413 is one of the applications 407. The bibliographic management application 413 manages bibliographic information printable by the MFPs 105 to 112 registered by the device management application 411, for each of the users registered by the authentication application 410. The bibliographic information refers to management information about each print job submitted to the MFPs 105 to 112, including a job identifier (ID) of the print job, the date and time of reception of the print job, an Internet Protocol (IP) address and a directory path of the MFP storing the print job, a name of the print job, and print settings of the print job.

A use statistics application 414 is one of the applications 407. The use statistics application 414 displays statistics information about the use records of the print and scan functions. For example, the statistics information is displayed on the web browser screen of the information processing apparatus (the PC) 102 for each of the MFPs 105 to 112 registered by the device management application 411 or for each of the users registered by the authentication application 410.

Next, a top menu screen, a hold exception condition screen, and a hold exception condition edit screen of each of the MFPs 105 to 112 according to the present exemplary embodiment will be described. The top menu screen, the hold exception condition screen, and the hold exception condition edit screen described below are displayed on the operation unit 206 of each of the MFPs 105 to 112. For simplification of description, the following description will be given using the MFP 105 as an example.

<Top Menu Screen of MFP>

Figure 5A:
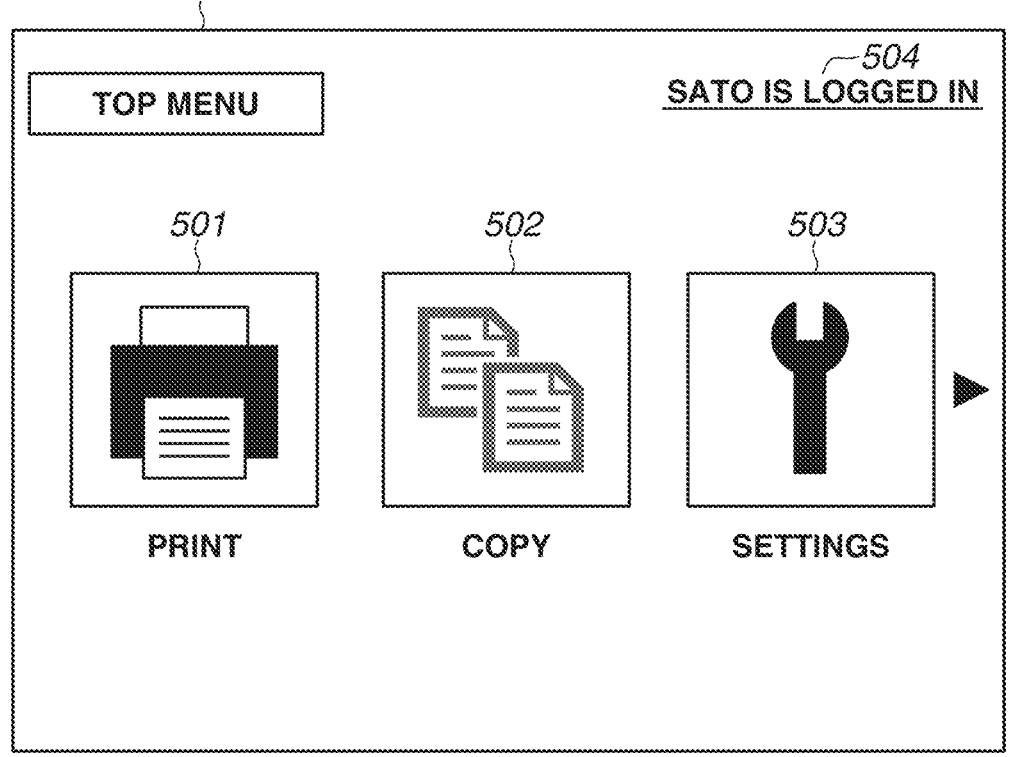
FIG. 5A is a diagram illustrating an example of a top menu screen.

FIG. 5A illustrates an example of a top menu screen 500 of the MFP 105 according to the present exemplary embodiment. The top menu screen 500 illustrated in FIG. 5A is displayed on the operation unit 206 of the MFP 105.

When a user logs in to the MFP 105 by using an integrated circuit (IC) card or the like, the top menu screen 500 appears after the login. On the top menu screen 500, the user can select an application to use on the MFP 105. Since the user is logged in to the MFP 105, a login username 504 is displayed on the top menu screen 500. FIG. 5A illustrates a screen example where "Sato" is displayed as the login username 504 during the login.

The top menu screen 500 displays icons (a print icon 501, a copy icon 502, and a settings icon 503) for the applications 309 installed on the MFP 105. The print icon 501 is the icon for the print application 324. When the print icon 501 is pressed, the print application 324 is activated. The copy icon 502 is the icon for the copy application 322. When the copy icon 502 is pressed, the copy application 322 is activated. The settings icon 503 is the icon for the setting application 323. When the settings icon 503 is pressed, the setting application 323 is activated.

<Hold Exception Condition Screen>

Figure 5B:
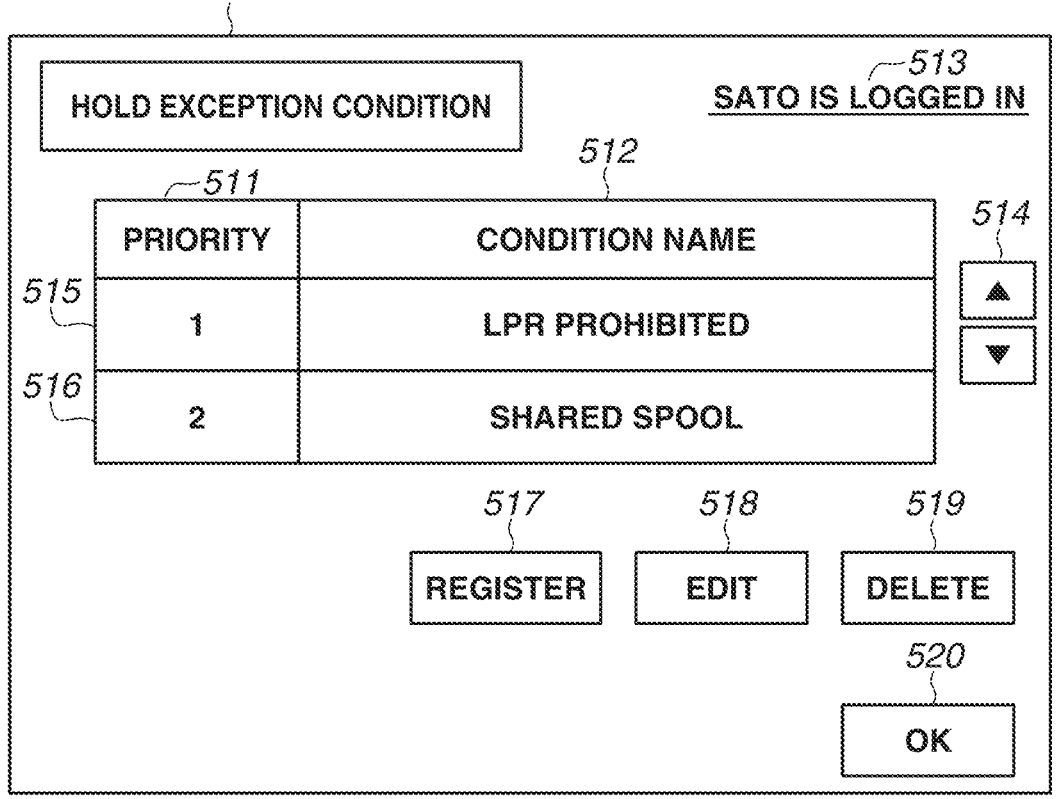
FIG. 5B is a diagram illustrating a hold exception condition screen.

FIG. 5B illustrates an example of a hold exception condition screen 510 of the MFP 105 according to the present exemplary embodiment. The hold exception condition screen 510 illustrated in FIG. 5B is displayed on the operation unit 206 by the setting application 323 executed by the CPU 201 of the MFP 105. The hold exception condition screen 510 displays a list of hold exception conditions 515 and 516 set for the MFP 105 operated by the user. The hold exception condition screen 510 of the setting application 323 is displayed when the user presses the settings icon 503 and then performs a predetermined selection operation. The hold exception condition screen 510 is displayed only when the user having an administrator authority is authenticated. In FIG. 5B, a login username 513 of the user having the administrator authority is displayed on the hold exception condition screen 510. FIG. 5B illustrates a screen example where "Sato" is displayed as the login username 513 of the user having the administrator authority during the login.

In the example of FIG. 5B, the list of the hold exception conditions 515 and 516 applied to the MFP 105 that the user is logged in is displayed. The list of the hold exception conditions 515 and 516 includes information about priority 511 of application of the hold exception conditions 515 and 516 and a condition name 512 of each of the hold exception conditions 515 and 516. The MFP 105 determines whether to store a received print job, based on the setting of the priority 511. The setting of the priority 511 of each of the hold exception conditions 515 and 516 can be changed when the user presses priority operation buttons 514. A new hold exception condition can be registered when the user presses a register button 517. When the user selects the hold exception condition 515 or 516 and then presses an edit button 518, the selected registered hold exception condition 515 or 516 can be edited. When the user selects the hold exception condition 515 or 516 and then presses a delete button 519, the selected registered hold exception condition 515 or 516 can be deleted. When an OK button 520 is pressed, the hold exception condition screen 510 transitions to a predetermined screen (e.g., a screen before transition to the hold exception condition screen 510).

<Hold Exception Condition Edit Screen>

FIG. 6A illustrates an example of the hold exception condition to be displayed when the user presses the edit button 518 illustrated in FIG. 5B. A hold exception condition edit screen 600 illustrated in FIG. 6A displays a login username 601 on-screen. The user can set any character string as a condition name 602. In the example of FIG. 6A, "LPR prohibited" is set as the condition name 602. A type 603 is used to set the type of hold exception condition. A print job attribute to be used by the MFP 105 in determining whether to hold a received print job is selected from options for the type 603 of hold exception condition. In the present exemplary embodiment, examples of the options for the type 603 include "username", "IP address", and "port". In the example of FIG. 6A, "port" is selected as the type 603. A port 604 is used to select the receiving network port of the print job to be set as the hold exception condition. In the present exemplary embodiment, examples of options for the port 604 include "LPR", "RAW", and "FTP". In the example of FIG. 6A, "LPR" is selected as the port 604.

An operation 605 to be performed when the hold exception condition is matched is used to set the operation to be performed when a print job received by the MFP 105 meets the hold exception condition set for the MFP 105. In the present exemplary embodiment, examples of options for the operation 605 include "print", "cancel", and "hold as shared job". In the example of FIG. 6A, "cancel" is selected as the operation 605. In other words, the hold exception condition edited in FIG. 6A is an operation setting for holding print jobs received by the MFP 105 via the network 101, with the exception that a print job submitted via a Line Printer Remote (LPR) network port is to be canceled. When the user presses an OK button 607, the hold exception condition displayed on the hold exception condition edit screen 600 is applied to the MFP 105. When the user presses a cancel button 606, the edits made to the hold exception condition displayed on the hold exception condition edit screen 600 are canceled.

FIG. 6B illustrates another example of the hold exception condition edit screen to be displayed when the user presses the edit button 518 illustrated in FIG. 5B. A hold exception condition edit screen 610 illustrated in FIG. 6B displays a login username 611 on-screen. The user can set any character string as a condition name 612. In the example of FIG. 6B, "store shared job" is set as the condition name 612. A type 613 is used to set the type of hold exception condition. A print job attribute to be used by the MFP 105 in determining whether to hold a received print job is selected from options for the type 613 of hold exception condition. In the present exemplary embodiment, examples of the options for the type 613 include "username", "IP address", and "port". In the example of FIG. 6B, "username" is selected as the type 613. A username 614 is used to set any character string as the username of the print job to be set as the hold exception condition. If no character string is set as the username 614 as in the example of FIG. 6B, the hold exception condition is applied to a print job including no username description.

An operation 615 to be performed when the hold exception condition is matched is used to set the operation to be performed when a print job received by the MFP 105 meets the hold exception condition set for the MFP 105. In the present exemplary embodiment, examples of options for the operation 615 include "print", "cancel", and "hold as shared job". In the example of FIG. 6B, "hold as shared job" is selected as the operation 615. In the case of holding a print job as a shared job, the print application 324 displays the print job on a list of print jobs when a user logs in. In other words, the hold exception condition edited in FIG. 6B is an operation setting for holding print jobs received by the MFP 105 via the network 101, with the exception that a print job including no username setting is held as a shared job. When the user presses an OK button 617, the hold exception condition displayed on the hold exception condition edit screen 610 is applied to the MFP 105. When the user presses a cancel button 616, the edits made to the hold exception condition displayed on the hold exception condition edit screen 610 are canceled.

Next, various functions and settings screens provided by the cloud server 104 according to the present exemplary embodiment will be described. The following various functions and settings screens are generated by the respective applications 407 on the cloud server 104 to provide the functions. The following various functions and settings screens are displayed, for example, on the web browser of the information processing apparatus (the PC) 102 by the web browser running on the information processing apparatus (the PC) 102 and communicating with the cloud server 104.

<Device Management Screen of Cloud Server>

FIG. 7A illustrates a device management display screen of the device management application 411 to be displayed when the user clicks on a devices tab 700. The device management display screen displays an add device button 701, an edit device button 702, a delete device button 703, and a list 704 of the MFPs 105 to 112 to which the functions of the cloud server 104 are provided. To add an MFP to which the cloud server 104 provides the functions, the user presses the add device button 701. To delete an MFP from the registered MFPs 105 to 112, the user presses the delete device button 703. To edit information (IP address, location, and group) about the registered MFPs 105 to 112, the user presses the edit device button 702. The cloud server 104 provides a group of the registered MFPs 105 to 112 with the functions such as authentication of usable users, statistics and visualization of the use records of the print and scan functions for each of the MFPs 105 to 112, and setting control of the remote printing.

<Extended Function Settings Screen of Cloud Server>

FIG. 7B illustrates an extended function settings screen to be displayed when the user clicks on an extended functions tub 710. Selections and settings can be made for the remote printing function, which is one of the extended functions. The setting application 412 running on the cloud server 104 generates a remote printing settings screen 711. The remote printing settings screen 711 is used to select a desired one from the following three settings as a setting value to be applied.

If a setting to "immediately execute all print jobs" 712 is selected, all the MFPs 105 to 112 registered by the device management application 411 print a print job immediately after receiving the print job without holding the print job. This setting disables the use of the remote printing.

If a setting to "hold print jobs using PC application" 713 is selected, a print application preinstalled on the information processing apparatus (the PC) 102 holds a received print job in a storage device of the information processing apparatus (the PC) 102, such as an HDD. The print application generates bibliographic information about the held print job and requests the bibliographic management application 413 on the cloud server 104 to add the bibliographic information. This setting enables all the MFPs 105 to 112 on the same network 101 to use the remote printing by obtaining a list of the bibliographic information from the bibliographic management application 413 on the cloud server 104.

If a setting to "hold print jobs in device" 714 is selected, all the MFPs 105 to 112 registered by the device management application 411 hold received print jobs in respective storage devices of the MFPs 105 to 112, such as the HDD 204. Each of the MFPs 105 to 112 having received a print job generates bibliographic information about the held print job and requests the bibliographic management application 413 on the cloud server 104 to add the bibliographic information. This setting enables the MFPs other than the one having received the print job to use the remote printing by obtaining a list of the bibliographic information from the bibliographic management application 413 on the cloud server 104. The user can set any time as a print job storage period 715 that is the period during which each of the MFPs 105 to 112 stores a print job. The print application 324 on each of the MFPs 105 to 112 holding a print job stores the print job for the time set as the print job storage period 715, after the reception of the print job. When the print job storage period 715 has elapsed, the print job is deleted. An exception condition settings button 716 is activated if the setting to "hold print jobs in device" 714 is selected. By pressing the exception condition settings button 716, the user can set a print job condition (a hold exception condition) for performing an operation (an exception) other than holding a received print job. When the user clicks on a save button 717, the setting value of the remote printing is saved and the changed setting is applied.

<Hold Exception Condition Settings Screen (1) of Cloud Server>

Figure 8A:
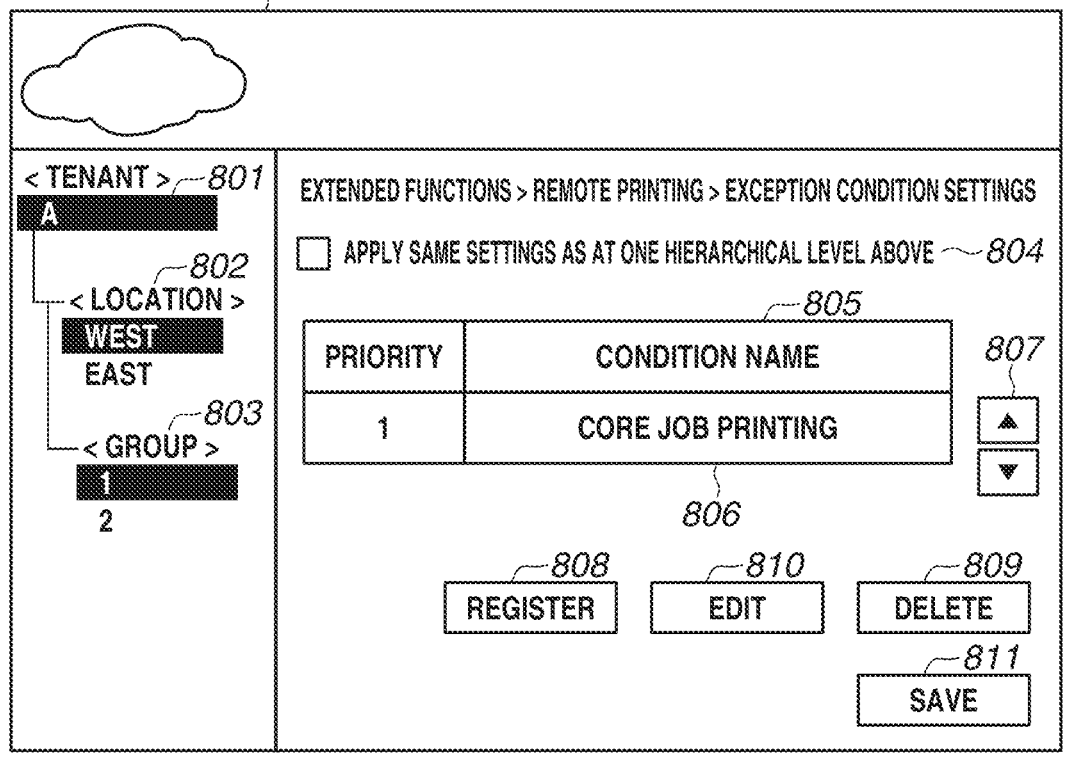
FIG. 8A is a diagram illustrating an example of a hold exception condition settings screen.

FIG. 8A illustrates an example of a hold exception condition settings screen 800 for print jobs, which is to be displayed when the user clicks on the exception condition settings button 716. The setting application 412 running on the cloud server 104 generates the hold exception condition settings screen 800. In the present exemplary embodiment, a different hold exception condition can be set for each of tenant 801, location 802, and group 803 by which the plurality of MFPs 105 to 112 is hierarchically classified. The tenant 801, the location 802, and the group 803 have a hierarchical structure with the tenant 801 at the top. The location 802 is at the level below the tenant 801, and the group 803 is at the level below the location 802. As described above, in the present exemplary embodiment, the plurality of MFPs 105 to 112 is classified and managed in a plurality of hierarchical levels based on the location information about the location where each of the MFPs 105 to 112 is disposed.

If a checkbox 804 in the hold exception condition settings screen 800 is checked, the same settings as at one hierarchical level above are applied. In the example of FIG. 8A, "A" is selected as the tenant 801, "west" as the location 802, and "1" as the group 803. Here, the three MFPs 105 to 107 belonging to the group "1" in the list 704 of the registered MFPs 105 to 112 are the application targets of the hold exception condition being set. A hold exception condition setting list 805 displays a list of hold exception conditions applied to the group "1" that is currently selected as the group 803. In the example of FIG. 8A, the hold exception condition setting list 805 displays a hold exception condition having a condition name 806 of "core job printing". The MFPs 105 to 107 that are the application targets of the hold exception condition determine whether to store a received print job based on the setting of priority. The setting of the priority of each hold exception condition can be changed when the user presses priority operation buttons 807. A new hold exception condition can be registered when the user presses a register button 808. When the user selects the hold exception condition and then presses a delete button 809, the selected registered hold exception condition can be deleted. When the user selects the hold exception condition and then presses an edit button 810, the selected registered hold exception condition can be edited. The set hold exception condition can be saved when the user presses a save button 811.

Figure 8B:
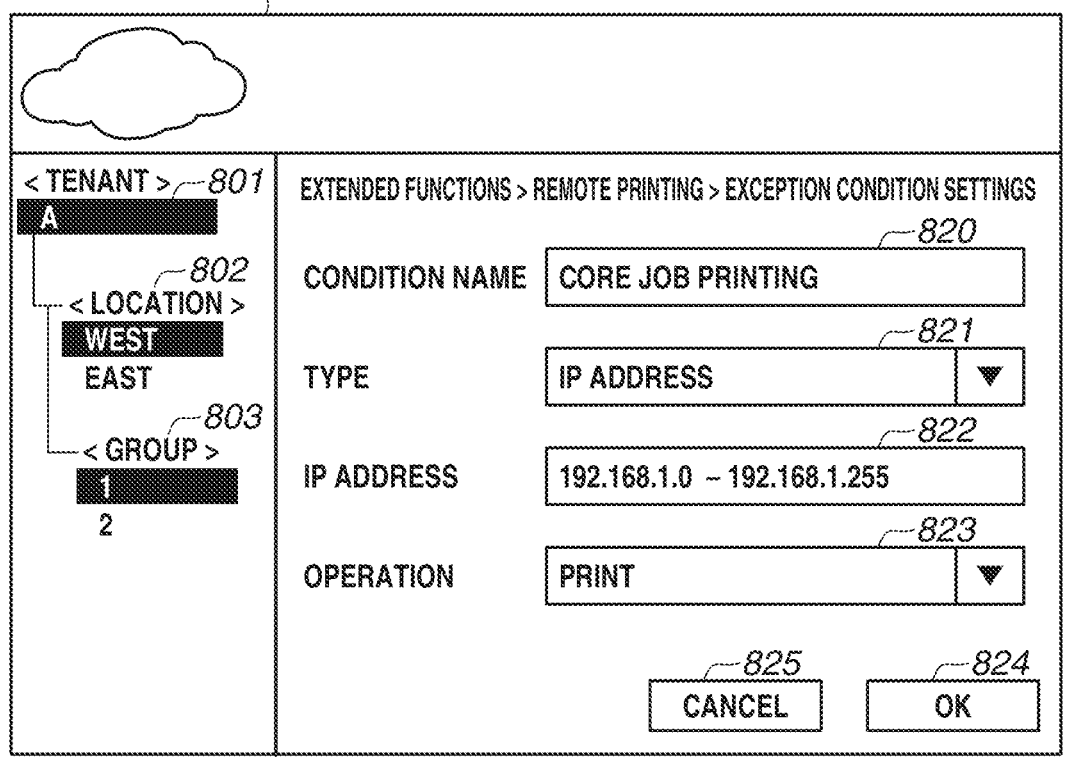
FIG. 8B is a diagram illustrating an example of a hold exception condition edit screen.

FIG. 8B illustrates an example of a hold exception condition edit screen for print jobs, which is to be displayed when the user clicks on the edit button 810 illustrated in FIG. 8A. The hold exception condition edit screen is used to edit the hold exception condition applied to a group of the MFPs 105 to 107 belonging to the group "1" that is currently selected as the group 803. The user can set any character string as a condition name 820. In the example of FIG. 8B, "core job printing" is set as the condition name 820. A type 821 is used to set the type of hold exception condition. A print job attribute to be used by each of the MFPs 105 to 107 in determining whether to hold a received print job is selected from options for the type 821 of hold exception condition. In the present exemplary embodiment, examples of the options for the type 821 include "username", "IP address", and "port". In the example of FIG. 8B, "IP address" is selected as the type 821. An IP address 822 is used to set the IP address of the print job to be set as the hold exception condition. As the IP address 822, a single IP address may be specified, or a range of IP addresses may be specified as illustrated in FIG. 8B.

An operation 823 to be performed when the hold exception condition is matched is used to set the operation to be performed when a print job received by any of the MFPs 105 to 107 meets the hold exception condition set for the MFPs 105 to 107. In the present exemplary embodiment, examples of options for the operation 823 include "print", "cancel", and "hold as shared job". In the example of FIG. 8B, "print" is selected as the operation 823. The hold exception condition illustrated in FIG. 8B indicates that a print job transmitted to any of the MFPs 105 to 107 from the system server 103 having an IP address in the set range is printed without being held as an exception. When the user presses an OK button 824, the hold exception condition displayed on the hold exception condition edit screen is applied to the MFPs 105 to 107 that are the application targets. When the user presses a cancel button 825, the edits made to the hold exception condition displayed on the hold exception condition edit screen are canceled.

<Hold Exception Condition Settings Screen (2) of Cloud Server>

FIG. 9A illustrates another example of the hold exception condition settings screen 800 for print jobs, which is to be displayed when the user clicks on the exception condition settings button 716. In FIG. 9A, similar components to those illustrated in FIG. 8A are denoted by the same reference numerals, and a redundant description thereof will be omitted. The setting application 412 running on the cloud server 104 generates the hold exception condition settings screen 800. In the example of FIG. 9A, "A" is selected as the tenant 801, "east" as the location 802, and "2" as the group 803. Here, the two MFPs 111 and 112 belonging to the group "2" in the list 704 of the registered MFPs 105 to 112 are the application targets of the hold exception condition being set. The hold exception condition setting list 805 displays a list of hold exception conditions applied to the group "2" that is currently selected as the group 803. In the example of FIG. 9A, the hold exception condition setting list 805 displays a hold exception condition having a condition name 901 of "guest user printing". The MFPs 111 and 112 that are the application targets of the hold exception condition determine whether to store a received job, based on the setting of priority.

FIG. 9B illustrates another example of the hold exception condition edit screen for print jobs, which is to be displayed when the user clicks on the edit button 810 illustrated in FIG. 9A. The hold exception condition edit screen is used to edit the hold exception condition applied to a group of the MFPs 111 and 112 belonging to the group "2" that is currently selected as the group 803. The user can set any character string as a condition name 910. In the example of FIG. 9B, "guest user printing" is set as the condition name 910. A type 911 is used to set the type of hold exception condition. A print job attribute to be used by each of the MFPs 111 and 112 in determining whether to hold a received print job is selected from options for the type 911 of hold exception condition. In the present exemplary embodiment, examples of the options for the type 911 include "username", "IP address", and "port". In the example of FIG. 9B, "username" is selected as the type 911. A username 912 is used to set the username of the print job to be set as the hold exception condition. If the username 912 is specified to be empty as illustrated in FIG. 9B, the hold exception condition is applied to a print job including no username setting.

An operation 913 to be performed when the hold exception condition is matched is used to set the operation to be performed when a print job received by any of the MFPs 111 and 112 meets the hold exception condition set for the MFPs 111 and 112. In the present exemplary embodiment, examples of options for the operation 913 include "print", "cancel", and "hold as shared job". In the example of FIG. 9B, "print" is selected as the operation 913. The hold exception condition illustrated in FIG. 9B indicates that a print job including no username description, i.e., a print job of a guest user not logged in is printed without being held as an exception. When the user presses an OK button 914, the hold exception condition displayed on the hold exception condition edit screen is applied to the MFPs 111 and 112 that are the application targets. When the user presses a cancel button 915, the edits made to the hold exception condition displayed on the hold exception condition edit screen are canceled.

<Procedure for Setting of Hold Exception Condition>

FIG. 10 is a flowchart illustrating an example of a procedure for setting a hold exception condition for the remote printing, which is performed by the cloud server 104 according to the present exemplary embodiment.

In step S1001, the setting application 412 running on the cloud server 104 accepts a login using the account of the user having the administrator authority via the web browser of the information processing apparatus (the PC) 102.

In step S1002, the setting application 412 displays the remote printing settings screen 711 on the web browser of the information processing apparatus (the PC) 102 in response to a user's operation for requesting the setting of the remote printing on the information processing apparatus (the PC) 102.

In step S1003, the setting application 412 displays the hold exception condition settings screen 800 on the web browser of the information processing apparatus (the PC) 102, using a user's click on the exception condition settings button 716 as a trigger.

In step S1004, the setting application 412 obtains the range of application targets of a hold exception condition selected by the user on the hold exception condition settings screen 800, and determines the range of application targets. In a case where the user selects a plurality of hold exception conditions, processing in steps S1004 to S1008 is repeated for each of the plurality of hold exception conditions.

If the range of application targets of the hold exception condition obtained in step S1004 is the tenant 801 (TENANT in step S1004), the processing proceeds to step S1005. In step S1005, the setting application 412 sets all the MFPs 105 to 112 registered in the tenant 801 as the application targets of the hold exception condition. In step S1008, the setting application 412 registers the hold exception condition.

If the range of application targets of the hold exception condition obtained in step S1004 is the location 802 (LOCATION in step S1004), the processing proceeds to step S1006. In step S1006, the setting application 412 sets the MFPs registered in the location set as the location 802 as the application targets of the hold exception condition. In step S1008, the setting application 412 registers the hold exception condition.

If the range of application targets of the hold exception condition obtained in step S1004 is the group 803 (GROUP in step S1004), the processing proceeds to step S1007. In step S1007, the setting application 412 sets the MFPs registered in the group set as the group 803 as the application targets of the hold exception condition. In step S1008, the setting application 412 registers the hold exception condition.

Processing for the hold exception condition registration in step S1008 will be described with reference to FIG. 11.

In step S1101, the setting application 412 obtains the character string of the condition name of the hold exception condition set by the user via the web browser of the information processing apparatus (the PC) 102.

In step S1102, the setting application 412 obtains the type of hold exception condition set by the user via the web browser of the information processing apparatus (the PC) 102, and determines the type of hold exception condition.

If the type of hold exception condition obtained in step S1102 is "IP address" (IP ADDRESS in step S1102), the processing proceeds to step S1103. In step S1103, the setting application 412 obtains the IP address set by the user via the web browser of the information processing apparatus (the PC) 102.

If the type of hold exception condition obtained in step S1102 is "username" (USERNAME in step S1102), the processing proceeds to step S1104. In step S1104, the setting application 412 obtains the username set by the user via the web browser of the information processing apparatus (the PC) 102.

If the type of hold exception condition obtained in step S1102 is "port" (PORT in step S1102), the processing proceeds to step S1105. In step S1105, the setting application 412 obtains the port selected by the user via the web browser of the information processing apparatus (the PC) 102, and determines the port.

If the port obtained in step S1105 is a "RAW" port (YES in step S1105), the processing proceeds to step S1106. In step S1106, the setting application 412 sets the type of hold exception condition to a RAW port-input print job.

If the port obtained in step S1105 is an "LPR" port (NO in step S1105), the processing proceeds to step S1107. In step S1107, the setting application 412 sets the type of hold exception condition to an LPR port-input print job.

In step S1108, the setting application 412 obtains the operation to be performed when the hold exception condition is matched, which is set by the user via the web browser of the information processing apparatus (the PC) 102, and determines the set operation.

If the operation to be performed when the hold exception condition is matched, which is obtained in step S1108, is "print" (PRINT in step S1108), the processing proceeds to step S1109. In step S1109, the setting application 412 sets the operation as "print", and registers the hold exception condition.

If the operation to be performed when the hold exception condition is matched, which is obtained in step S1108, is "hold as shared job" (HOLD AS SHARED JOB in step S1108), the processing proceeds to step S1110. In step S1110, the setting application 412 sets the operation as "hold as shared job", and registers the hold exception condition.

If the operation to be performed when the hold exception condition is matched, which is obtained in step S1108, is "cancel" (CANCEL in step S1108), the processing proceeds to step S1111. In step S1111, the setting application 412 sets the operation as "cancel", and registers the hold exception condition.

<Procedure for Application of Hold Exception Condition to MFP>

Figure 12:
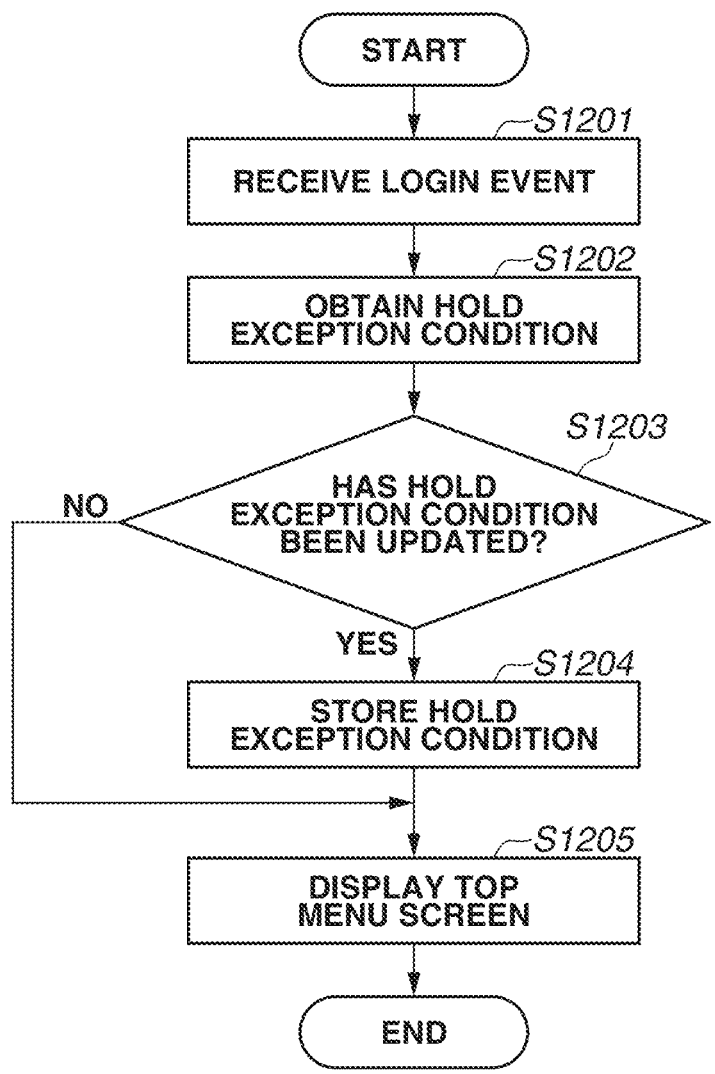
FIG. 12 is a flowchart illustrating an example of a processing procedure for the MFP to obtain a hold exception condition.

FIG. 12 is a flowchart illustrating an example of a processing procedure for obtaining a hold exception condition from the cloud server 104, which is performed by each of the MFPs 105 to 112 according to the present exemplary embodiment. Each processing illustrated in FIG. 12 is performed by the CPU 201 of each of the MFPs 105 to 112. In the following description, the MFP 105 is taken as an example for ease of description.

In step S1201, the setting application 323 on the MFP 105 receives, from the application platform 307, a login event of a user authenticated with an IC card or the like on the MFP 105.

In step S1202, the setting application 323 connects to the setting application 412 on the cloud server 104 via the network 101, and obtains the hold exception condition set for the MFP 105.

In step S1203, the setting application 323 determines whether the hold exception condition obtained in step S1202 has been updated from the one obtained last time. If the hold exception condition is determined to have been updated (YES in step S1203), the processing proceeds to step S1204. If the hold exception condition is determined to not have been updated (NO in step S1203), the processing proceeds to step S1205.

In step S1204, the setting application 323 stores the hold exception condition obtained in step S1202 into the HDD 204 of the MFP 105 for update.

In step S1205, the MFP 105 displays the top menu screen 500.

<Exception Condition Determination Procedure for Print Job>

FIG. 13 is a flowchart illustrating an example of a processing procedure for determining an exception condition for a print job, which is performed by each of the MFPs 105 to 112 according to the present exemplary embodiment. Each processing illustrated in FIG. 13 is performed by the CPU 201 of each of the MFPs 105 to 112. In the following description, the MFP 105 is taken as an example for ease of description.

In step S1301, the job and device control module 304 of the MFP 105 waits for reception of a print job.

In step S1302, the job and device control module 304 receives a print job via the network I/F 210, and notifies the print application 324 of the print job.

In step S1303, the print application 324 determines whether the MFP 105 is set to hold print jobs. If the MFP 105 is not set to hold print jobs (NO in step S1303), the processing proceeds to step S1304. In step S1304, the print application 324 immediately prints the print job received in step S1302. If the MFP 105 is set to hold print jobs (YES in step S1303), the processing proceeds to step S1305.

In step S1305, the print application 324 determines whether a hold exception condition is set. If no hold exception condition is set (NO in step S1305), the processing proceeds to step S1316. In step S1316, the print application 324 holds the print job received in step S1302. If a hold exception condition is set (YES in step S1305), the processing proceeds to step S1306.

In step S1306, the print application 324 obtains a list of set hold exception conditions.

In step S1307, the print application 324 obtains the type of hold exception condition in descending order of priority from the list of set hold exception conditions.

If the type of hold exception condition obtained in step S1307 is "IP address" (IP ADDRESS in step S1307), the processing proceeds to step S1308. In step S1308, the print application 324 obtains the IP address of the print job.

If the type of hold exception condition obtained in step S1307 is "username" (USERNAME in step S1307), the processing proceeds to step S1309. In step S1309, the print application 324 obtains the username of the print job.

If the type of hold exception condition obtained in step S1307 is "port" (PORT in step S1307), the processing proceeds to step S1310. In step S1310, the print application 324 obtains the input port of the print job.

In step S1311, the print application 324 determines whether the print job information obtained in any one of steps S1308 to S1310 matches the set hold exception condition. If the print job information is determined to not match the set hold exception condition (NO in step S1311), the processing proceeds to step S1316. In step S1316, the print application 324 holds the print job received in step S1302. If the print job information is determined to match the set hold exception condition (YES in step S1311), the processing proceeds to step S1312. If, in step S1311, there is another hold exception condition that is lower in priority than the current hold exception condition, the processing may return to step S1307.

In step S1312, the print application 324 obtains the operation to be performed when the hold exception condition is matched, which is set in the hold exception condition, and determines the set operation.

If the operation to be performed when the hold exception condition is matched, which is obtained in step S1312, is "print" (PRINT in step S1312), the processing proceeds to step S1313. In step S1313, the print application 324 prints the print job received in step S1302.

If the operation to be performed when the hold exception condition is matched, which is obtained in step S1312, is "cancel" (CANCEL in step S1312), the processing proceeds to step S1314. In step S1314, the print application 324 cancels the print job received in step S1302.

If the operation to be performed when the hold exception condition is matched, which is obtained in step S1312, is "hold as shared job" (HOLD AS SHARED JOB in step S1312), the processing proceeds to step S1315. In step S1315, the print application 324 holds the print job received in step S1302 as a shared job.

The foregoing description has been given by using the setting of print job hold exception conditions for the MFPs 105 to 112 as an example. However, this is not restrictive. The present exemplary embodiment is not limited to the setting of print job hold exception conditions but is also applicable to other remote printing-related settings that can be made for the MFPs 105 to 112.

As described above, according to the present exemplary embodiment, the remote printing-related settings to be applied to the MFPs 105 to 112 can be registered in the cloud server 104 with the application ranges set, and each of the MFPs 105 to 112 can obtain the remote printing-related settings from the cloud server 104 and make the settings. The remote printing-related settings can thus be appropriately and easily made for the target MFPs 105 to 112 of the remote printing. For example, a remote printing system can be achieved in which the complicated setting of hold exception conditions with a lot of setting items can be easily made in a short time and fine settings can also be made individually for each of the MFPs 105 to 112.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-205901, filed Dec. 11, 2020, which is hereby incorporated by reference herein in its entirety.

What is claimed is:

1. An image forming system comprising:
    a server; and
    a plurality of image forming apparatuses having a print function and connected to the server via a network,
    wherein the server includes:
    one or more first memories; and
    one or more first processors that execute a set of first instructions to:
        provide an administrator screen configured to make a first setting related to the print function and make a second setting for defining an application target of the first setting from among the plurality of image forming apparatuses; and
        manage setting information about the print function of each of the plurality of image forming apparatuses based on the first setting and the second setting that are made on the administrator screen, and
    wherein an image forming apparatus included in the plurality of image forming apparatuses includes:
    one or more second memories; and
    one or more second processors that execute a set of second instructions to:
        obtain the setting information about the print function of the image forming apparatus via the network; and
        apply the obtained setting information to the image forming apparatus.

2. The image forming system according to claim 1, wherein the one or more first processors further execute the first instructions to classify and manage the plurality of image forming apparatuses in a plurality of hierarchical levels, and
    wherein the second setting defines the application target of the first setting based on the plurality of hierarchical levels.

3. The image forming system according to claim 2, wherein the plurality of image forming apparatuses is classified and managed in the plurality of hierarchical levels based on information about a location where each of the plurality of image forming apparatuses is disposed.

4. The image forming system according to claim 2, wherein in a case where the first setting is not made at a hierarchical level among the plurality of hierarchical levels, the first setting made at a hierarchical level immediately above the hierarchical level is applied to the hierarchical level.

5. The image forming system according to claim 1, wherein the first setting is a setting related to hold printing of a print job transmitted from an external apparatus to each of the plurality of image forming apparatuses.

6. The image forming system according to claim 1, wherein the first setting is made for each of the plurality of image forming apparatuses via a screen displayed on an operation device of each of the plurality of image forming apparatuses.

7. The image forming system according to claim 1, wherein the obtained setting information is not applied to the image forming apparatus in a case where the obtained setting information is not different from the setting information obtained last time, and the obtained setting information is applied to the image forming apparatus in a case where the obtained setting information is different from the setting information obtained last time.

8. A server connected via a network to a plurality of image forming apparatuses having a print function, the server comprising:
    one or more memories; and
    one or more processors that execute a set of first instructions to:
        provide an administrator screen configured to make a first setting related to the print function and make a second setting for defining an application target of the first setting from among the plurality of image forming apparatuses;
        manage setting information about the print function of each of the plurality of image forming apparatuses based on the first setting and the second setting that are made on the administrator screen; and
        transmit the managed setting information about the print function to each of the plurality of image forming apparatuses.

9. A control method for an image forming system including a server and a plurality of image forming apparatuses having a print function and connected to the server via a network, the control method comprising:
    providing, by the server, an administrator screen configured to make a first setting related to the print function and make a second setting for defining an application target of the first setting from among the plurality of image forming apparatuses;
    managing, by the server, setting information about the print function of each of the plurality of image forming apparatuses based on the first setting and the second setting that are made on the administrator screen;
    obtaining, by an image forming apparatus included in the plurality of image forming apparatuses, the setting information about the print function of the image forming apparatus via the network; and
    applying, by the image forming apparatus, the obtained setting information to the image forming apparatus.

10. A control method for a server connected via a network to a plurality of image forming apparatuses having a print function, the control method comprising:
    providing an administrator screen configured to make a first setting related to the print function and make a second setting for defining an application target of the first setting from among the plurality of image forming apparatuses;
    managing setting information about the print function of each of the plurality of image forming apparatuses based on the first setting and the second setting that are made on the administrator screen; and
    transmitting the managed setting information about the print function to each of the plurality of image forming apparatuses.

11. A non-transitory computer readable storage medium storing a computer program for causing a computer to execute a control method for a server connected via a network to a plurality of image forming apparatuses having a print function, the control method comprising:
- providing an administrator screen configured to make a first setting related to the print function and make a second setting for defining an application target of the first setting from among the plurality of image forming apparatuses;
- managing setting information about the print function of each of the plurality of image forming apparatuses based on the first setting and the second setting that are made on the administrator screen; and
- transmitting the managed setting information about the print function to each of the plurality of image forming apparatuses.

* * * * *